(12) United States Patent
Takahashi et al.

(10) Patent No.: US 9,036,483 B2
(45) Date of Patent: May 19, 2015

(54) MOBILE COMMUNICATION METHOD AND RADIO BASE STATION

(75) Inventors: Hideaki Takahashi, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/880,546

(22) PCT Filed: Oct. 20, 2011

(86) PCT No.: PCT/JP2011/074097
§ 371 (c)(1),
(2), (4) Date: Aug. 2, 2013

(87) PCT Pub. No.: WO2012/053574
PCT Pub. Date: Apr. 26, 2012

(65) Prior Publication Data
US 2013/0301512 A1    Nov. 14, 2013

(30) Foreign Application Priority Data
Oct. 20, 2010 (JP) ............... P2010-235976

(51) Int. Cl.
*H04L 1/00* (2006.01)
*H04W 72/00* (2009.01)
*H04W 72/12* (2009.01)
*H04W 92/20* (2009.01)

(52) U.S. Cl.
CPC ........ *H04W 72/005* (2013.01); *H04W 72/1226* (2013.01); *H04W 92/20* (2013.01)

(58) Field of Classification Search
USPC ......... 370/217, 221, 225, 226, 229, 236, 277, 370/310, 315, 328, 331, 332; 455/434, 455/436–444, 446, 63.1, 67.13
See application file for complete search history.

(56) References Cited

U.S. PATENT DOCUMENTS

| | | | |
|---|---|---|---|
| 8,423,008 B2 * | 4/2013 | Pedersen et al. | 455/418 |
| 2009/0252077 A1 * | 10/2009 | Khandekar et al. | 370/312 |
| 2010/0189039 A1 * | 7/2010 | Wang et al. | 370/328 |
| 2011/0081865 A1 * | 4/2011 | Xiao et al. | 455/63.1 |
| 2011/0249611 A1 * | 10/2011 | Khandekar et al. | 370/315 |
| 2013/0223416 A1 * | 8/2013 | Michel | 370/336 |

OTHER PUBLICATIONS

Huawei, "Understanding the Time Domain eICIC Schemes," Aug. 23-27, 2010, 3GPP TSG RAN WG1 meeting #62, R1-104308, All pages.*
Notice of Grounds for Rejection in corresponding Japanese application No. 2012-026623 dated Jun. 11, 2013 (5 pages).
NTT DOCOMO; "Views on eICIC Schemes for Rel-10"; 3GPP TSG RAN WG1 Meeting #62bis, R1-105442; Xian, China; Oct. 11-15, 2010 (9 pages).
Nokia Siemens Networks; "Complete list of served cells to be provided in X2 Setup and eNB Configuration Update messages"; 3GPP TSG-RAN WG3 Meeting #69, R3-102359; Madrid, Spain; Aug. 23-27, 2010 (9 pages).
International Search Report issued in PCT/JP2011/074097 mailed on Nov. 15, 2011 (4 pages).

(Continued)

*Primary Examiner* — Curtis A Alia
(74) *Attorney, Agent, or Firm* — Osha Liang LLP

(57) ABSTRACT

A mobile communication method according to the present invention includes a step of setting, by a radio base station eNB#10, when a subframe designated by a pattern of ABS, the pattern being notified by a radio base station eNB#1, matches a subframe set as an MBSFN subframe, the matching subframe as an MBSFN subframe used for "eICIC".

2 Claims, 9 Drawing Sheets

(56) References Cited

OTHER PUBLICATIONS

Japanese Office Action from Application No. 2010-235976 mailed on Nov. 15, 2011 (4 pages).

3GPP TS 36.305 V9.4.0; "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)"; Sep. 2010 (52 pages).

3GPP TS 36.211 V9.1.0; "3rd Generation Partnership Project; Technical Specification Group Radio Access Network; Evolved Universal Terrestrial Radio Access (E-UTRA); Physical Channels and Modulation (Release 9)"; Mar. 2010 (85 pages).

3GPP TS 36.300 V10.1.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Sep. 2010 (192 pages).

3GPP TS 36.423 V9.4.0; "3rd Generation Partnership Project; Technical Specification Group Radio Access Network; Evolved Universal Terrestrial Radio Access Network (E-UTRAN); X2 application protocol (X2AP) (Release 9)"; Sep. 2010 (121 pages).

Alcatel-Lucent et al.; "Way Forward on time-domain extension of Rel 8/9 backhaul-based ICIC" TSG-RAN WG1 Meeting #62bis, R1-105749; Xi'an, P.R. China; Oct. 11-15, 2010 (4 pages).

Ran 1; "Way Forward on time-domain extension of Rel 8/9 backhaul-based ICIC" TSG-RAN WG1 Meeting #62bis, R1-105779; Xi'an, P.R. China; Oct. 11-15, 2010 (4 pages).

Alcatel-Lucent et al.; "LS on time-domain extension of Rel 8/9 backhaul-based ICIC for Macro-Pico scenario" 3GPP TSG-RAN WG1 Meeting #62bis, R1-105750; Xi'an, China; Oct. 11-15, 2010 (2 pages).

NTT DOCOMO, Inc. et al.; "MBSFN subframe and ABS coordination for eICIC" 3GPP TSG-RAN WG3 Meeting #70, R3-103444; Jacksonville (FL), USA; Nov. 15-19, 2010 (4 pages).

\* cited by examiner

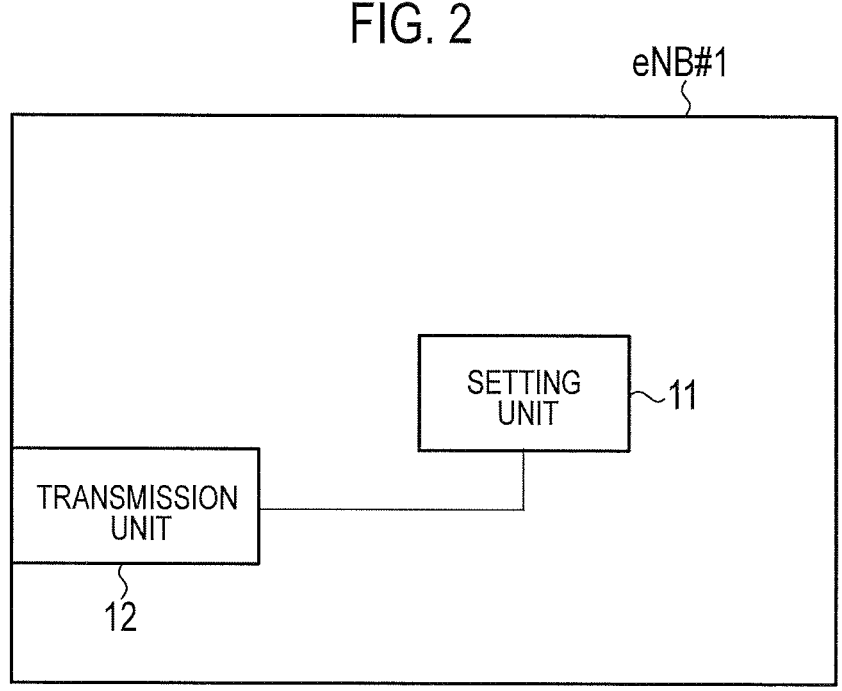
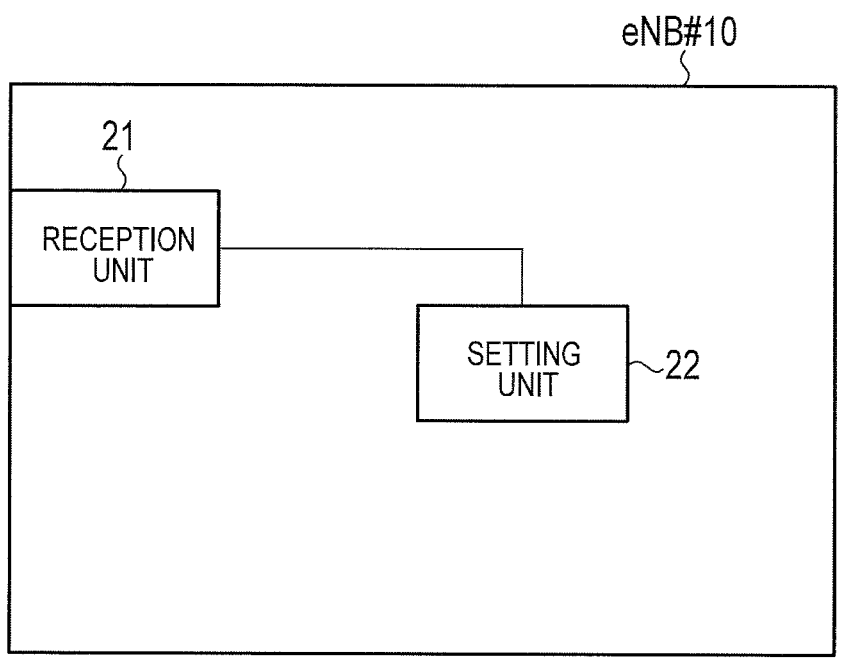

FIG. 10

| IE/Group Name | Presence | Range | IE type and reference | Semantics description | Criticality | Assigned Criticality |
|---|---|---|---|---|---|---|
| Message Type | M | | 9.2.13 | | YES | reject |
| Served Cells To Add | | 0 to maxCellineNB | | This IE shall contain the complete list of added cells served by the eNB | GLOBAL | reject |
| >Served Cell Information | M | | | | | - |
| >Neighbour Information | | 0 to maxncoofNeighbours | | | - | - |
| >>ECGI | M | | ECGI 9.2.14 | E-UTRAN Cell Global Identifier of the neighbour cell | - | - |
| >>PCI | M | | INTEGER (0..503,...) | Physical Cell Identifier of the neighbour cell | - | - |
| >>EARFCN | M | | 9.2.26 | DL EARFCN for FDD and EARFCN for TDD | - | - |
| Served Cells To Modify | | 0 to maxCellineNB | | This IE shall contain the complete list of modified cells served by the eNB | GLOBAL | reject |
| >Old ECGI | M | | ECGI 9.2.14 | This is the old E-UTRAN Cell Global Identifier | - | - |
| >Served Cell Information | M | | 9.2.8 | | - | - |
| >Neighbour Information | | 0 to maxnoofNeighbours | | | - | - |
| >>ECGI | M | | ECGI 9.2.14 | E-UTRAN Cell Global Identifier of the neighbour cell | - | - |
| >>PCI | M | | INTEGER (0..503,...) | Physical Cell Identifier of the neighbour cell | - | - |
| >>EARFCN | M | | 9.2.26 | DL EARFCN for FDD and EARFCN for TDD | - | - |
| >Deactivation Indication | O | | ENUMERATED(deactivated, ...) | Indicates the concerned cell is switched off for energy saving reasons | YES | ignore |
| Served Cells To Delete | | 0 to maxCellineNB | | This IE shall contain the complete list of deleted cells served by the eNB | GLOBAL | reject |
| >Old ECGI | M | | ECGI 9.2.14 | This is the old E-UTRAN Cell Global Identifier of the cell to be deleted | - | - |
| GU Group Id To Add List | | 0 to maxPools | | | GLOBAL | reject |
| >GU Group Id | M | | 9.2.20 | | | |
| GU Group Id To Delete List | | 0 to maxPools | | | GLOBAL | reject |
| >GU Group Id | M | | 9.2.20 | | - | - |

FIG. 11

| IE/Group Name | Presence | Range | IE type and reference | Semantics description | Criticality | Assigned Criticality |
|---|---|---|---|---|---|---|
| PCI | M | | INTEGER (0..503,...) | Physical Cell ID | – | – |
| Cell ID | M | | ECGI 9.2.14 | | – | – |
| TAC | M | | OCTET STRING(2) | Tracking Area Code | – | – |
| Broadcast PLMNs | | 1..<maxnoofBPLMNs> | | Broadcast PLMNs | – | – |
| >PLMN Identity | M | | 9.2.4 | | – | – |
| CHOICE EUTRA-Mode-Info | M | | | | – | – |
| >FDD | | 1 | | | | |
| >>FDD Info | | | | | – | – |
| >>>UL EARFCN | M | | EARFCN 9.2.26 | Corresponds to $N_{UL}$ in ref. [16] | – | – |
| >>>DL EARFCN | M | | EARFCN 9.2.26 | Corresponds to $N_{DL}$ in ref. [16] | – | – |
| >>>UL Transmission Bandwidth | M | | Transmission Bandwidth 9.2.27 | | – | – |
| >>>DL Transmission Bandwidth | M | | Transmission Bandwidth 9.2.27 | Same as UL Transmission Bandwidth in this release. | | |
| >TDD | | 1 | | | – | – |
| >>TDD Info | | | | | – | – |
| >>>EARFCN | M | | 9.2.26 | Corresponds to $N_{DL}/N_{UL}$ in ref. [16] | – | – |
| >>>Transmission Bandwidth | M | | Transmission Bandwidth 9.2.27 | | – | – |
| >>>Subframe Assignment | M | | ENUMERATED(sa0, sa1, sa2, sa3, sa4, sa5, sa6,...) | Uplink-downlink subframe configuration information defined in ref. [10]. | – | – |
| >>>Special Subframe Info | | 1 | | Special subframe configuration information defined in ref. [10]. | – | – |
| >>>>SpecialSubframe Patterns | M | | ENUMERATED(ssp0, ssp1, ssp2, ssp3 ssp4, ssp5, ssp6, ssp7, ssp8,....) | | – | – |
| >>>>Cyclic Prefix DL | M | | ENUMERATED(, Extended...) | | – | – |
| >>>>Cyclic Prefix UL | M | | ENUMERATED(, Extended...) | | – | – |
| Number of Antenna Ports | O | | 9.2.43 | | YES | ignore |
| PRACH Configuration | O | | PRACH Configuration 9.2.50 | | YES | ignore |
| MBSFN Subframe Info | | 0 to maxnoofMBSFN | | MBSFN subframe configuration information defined in ref. [9] | GLOBAL | ignore |
| >Radioframe Allocation Period | M | | ENUMERATED(n1, n2, n4, n8, n16, n32,...) | | – | – |
| >Radioframe Allocation Offset | M | | INTEGER (0..7,...) | | – | – |
| >Subframe Allocation | M | | 9.2.51 | | – | – |
| Almost Blank Subframe Info | Optional | | | | – | – |

FIG. 12

| IE/Group Name | Presence | Range | IE Type and Reference | Semantics Description |
|---|---|---|---|---|
| Almost Blank Subframe Allocation | M | | BITSTRING (SIZE(40)) | "1" denotes that the corresponding downlink subframe with periodicity of four frames is almost blanked. The new period begins when equation SFN mod four = zero is satisfied. NOTE: This IE can be used when SFN is synchronized among eNBs. |

MOBILE COMMUNICATION METHOD AND RADIO BASE STATION

TECHNICAL FIELD

The present invention relates to a mobile communication method and a radio base station.

BACKGROUND ART

In an LTE (Long Term Evolution) scheme, in order to reduce inter-cell interference, it is discussed to use "eICIC (Enhanced Inter Cell Interference Coordination)".

In "Time domain resource partitioning" that is a kind of a control method of the "eICIC", in order to reduce inter-cell interference, it is configured to be able to use an MBSFN (Multicast Broadcast Single Frequency Network) subframe as well as ABS (Almost Blank Subframe).

Specifically, in a mobile communication system in which a cell #10 (for example, a Pico cell or a Femto cell) subordinate to a radio base station eNB#10 is geographically arranged to be superposed on a cell #1 (for example, a Macro cell) subordinate to a radio base station eNB#1, when the "Time domain resource partitioning" is applied, it is configured to be able to reduce interference to the cell #10 from the cell #1 by setting the ABS and the MBSFN subframe in the cell #1.

CITATION LIST

Non Patent Literature

[NPL 1] 3GPP contribution R1-105779
[NPL 2] 3GPP TS36.423
[NPL 3] 3GPP TS36.300
[NPL 4] 3GPP TS36.211
[NPL 5] 3GPP TS36.305

However, in the conventional LTE scheme, an MBSFN subframe includes: an MBSFN subframe used for the "eICIC"; and a normal MBSFN subframe not used for the "eICIC", that is, used to transmit data for MBMS (Multimedia Broadcast Multicast Service) from the radio base station eNB#1, used to transmit a Positioning Reference Signal used for mobile station positioning by "OTDOA (Observed Time Difference Of Arrival)", or used for Energy Saving.

The conventional LTE scheme, however, has a problem in that it is not defined as to how the setting of the ABS or the MBSFN subframe used for the "eICIC" is changed when setting of the MBSFN subframe not used for the "eICIC" is changed.

SUMMARY OF THE INVENTION

Therefore, the present invention is achieved in view of the above-described problems, and an object thereof is to provide a mobile communication method and a radio base station, with which it is possible to appropriately change setting of an MBSFN subframe not used for "eICIC" and setting of ABS and an MBSFN subframe used for the "eICIC".

A first characteristic of the present invention is summarized in that a mobile communication method, in which inter-cell interference coordination is performed between a first cell and a second cell by using a subframe set as a first subframe and a subframe set as a second subframe in a mobile communication system in which the second cell subordinate to a second radio base station is geographically arranged to be superposed on the first cell subordinate to a first radio base station, includes: a step of setting, by the second radio base station, a subframe, which is designated by first setting information received from the first radio base station, as the first subframe; a step of setting, by the second radio base station, a subframe, which is designated by second setting information received from the first radio base station, as the second subframe; a step of changing, by the second radio base station, setting of the first subframe and releasing setting of the second subframe on the basis of change information of the first subframe received from the first radio base station; and a step of newly setting, by the second radio base station, the subframe, which is designated by the second setting information received from the first radio base station, as the second subframe, wherein the first radio base station is able to transmit a reference signal for the first cell only in a first OFDM symbol in the subframe set as the first subframe, and the first radio base station is able to transmit the reference signal for the first cell in a predetermined OFDM symbol in the subframe set as the second subframe.

A second characteristic of the present invention is summarized in that a mobile communication method, in which inter-cell interference coordination is performed between a first cell and a second cell by using a subframe set as a first subframe and a subframe set as a second subframe in a mobile communication system in which the second cell subordinate to a second radio base station is geographically arranged to be superposed on the first cell subordinate to a first radio base station, includes: a step of setting, by the second radio base station, a subframe, which is designated by first setting information received from the first radio base station, as the first subframe; a step of setting, by the second radio base station, a subframe, which is designated by second setting information received from the first radio base station, as the second subframe; and a step of changing, by the second radio base station, setting of the first subframe and the second subframe on the basis of change information of the first subframe and change information of the second subframe included in one message received from the first radio base station, wherein the first radio base station is able to transmit a reference signal for the first cell only in a first OFDM symbol in the subframe set as the first subframe, and the first radio base station is able to transmit the reference signal for the first cell in a predetermined OFDM symbol in the subframe set as the second subframe.

A third characteristic of the present invention is summarized in that a radio base station, which is able to function as a second radio base station in a mobile communication system which includes a second cell subordinate to the second radio base station geographically arranged to be superposed on a first cell subordinate to a first radio base station, the mobile communication system being configured to be able to perform inter-cell interference coordination between the first cell and the second cell by using a subframe set as a first subframe and a subframe set as a second subframe, wherein the second radio base station includes a setting unit configured to set a subframe, which is designated by first setting information received from the first radio base station, as the first subframe and to set a subframe, which is designated by second setting information received from the first radio base station, as the second subframe, and wherein the setting unit is configured to change setting of the first subframe and release setting of the second subframe on the basis of change information of the first subframe received from the first radio base station.

A fourth characteristic of the present invention is summarized in that a radio base station, which is able to function as a first radio base station in a mobile communication system which includes a second cell subordinate to the second radio base station geographically arranged to be superposed on a first cell subordinate to a first radio base station, the mobile communication system being configured to be able to perform inter-cell interference coordination between the first cell and the second cell by using a subframe set as a first subframe and a subframe set as a second subframe, includes: a setting unit configured to determine subframes to be set as the first subframe and the second subframe; and a transmission unit configured to notify the second radio base station of the subframe to be set as the first subframe by first setting information, and to notify the second radio base station of the subframe to be set as the second subframe by second setting information, wherein, when the setting unit determines to change the subframes to be set as the first subframe and the second subframe, the transmission unit is configured to notify the second radio base station of change information of the first subframe and change information of the second subframe by one message.

As described above, according to the present invention, it is possible to provide a mobile communication method and a radio base station with which it is possible to appropriately change setting of an MBSFN subframe not used for "eICIC" and setting of ABS and an MBSFN subframe used for the "eICIC".

BRIEF DESCRIPTION OF DRAWINGS

FIG. 2 is a functional block diagram of a radio base station eNB#1 according to the first embodiment of the present invention.

FIG. 3 is a functional block diagram of a radio base station eNB#10 according to the first embodiment of the present invention.

FIG. 10 is a diagram illustrating an example of a format of "eNB Configuration Update" used in a mobile communication system according to a first modification of the present invention.

FIG. 11 is a diagram illustrating an example of a format of an information element "Served Cell Information" of the "eNB Configuration Update" used in the mobile communication system according to the first modification of the present invention.

FIG. 12 is a diagram illustrating an example of a format of an information element "Almost Blank Subframe Allocation" of the information element "Served Cell Information" of the "eNB Configuration Update" used in the mobile communication system according to the first modification of the present invention.

DESCRIPTION OF EMBODIMENTS (Mobile Communication System According to First Embodiment of the Present Invention)

With reference to FIG. 1 through FIG. 9, a mobile communication system according to a first embodiment of the present invention will be described. In the present embodiment, an LTE mobile communication system will be described as an example of the mobile communication system according to the present embodiment. However, the present invention is also applicable to mobile communication systems other than the LTE mobile communication system.

Figure 1:
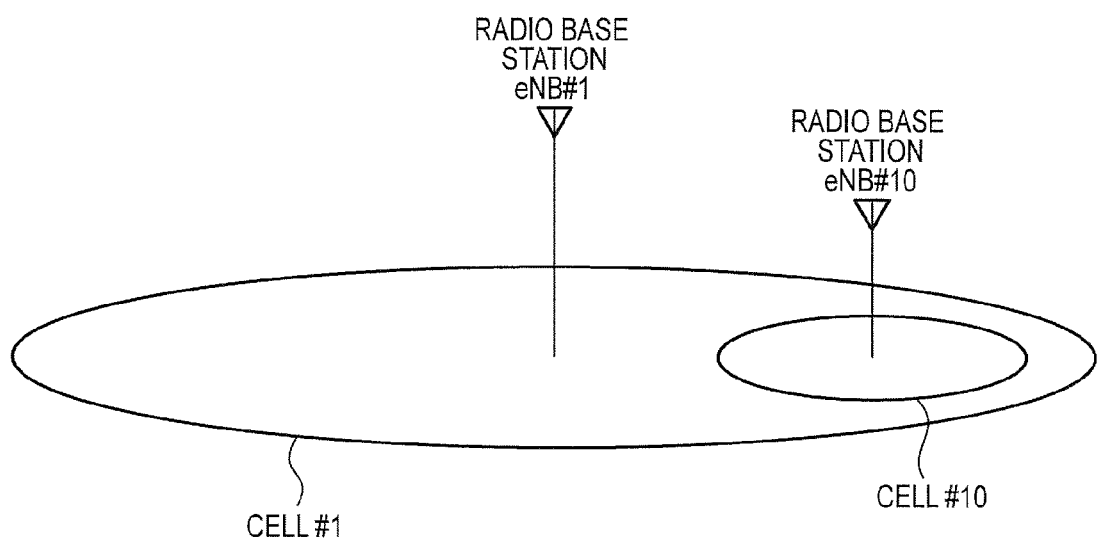
FIG. 1 is a diagram illustrating the entire configuration of a mobile communication system according to a first embodiment of the present invention.

As illustrated in FIG. 1, the mobile communication system according to the present embodiment includes a radio base station eNB#1 configured to manage a cell #1 and a radio base station eNB#10 configured to manage a cell #10.

For example, the cell #1 is a Macro cell, and the cell #10 is a CSG cell, a Femto cell, a Micro cell, a Pico cell and the like.

Furthermore, in the mobile communication system according to the present embodiment, as illustrated in FIG. 1, the cell #10 subordinate to the radio base station eNB#10 is geographically arranged to be superposed on the cell #1 subordinate to the radio base station eNB#1.

Furthermore, in order to reduce interference to the cell #10 by the cell #1, in the mobile communication system according to the present embodiment is configured to be able to apply "Time domain resource partitioning" that is a kind of "eICIC".

As illustrated in FIG. 2, the radio base station eNB#1 includes a setting unit 11 and a transmission unit 12.

The setting unit 11 is configured to determine a subframe (ABS or an MBSFN subframe) to be used for the "eICIC".

Furthermore, in a subframe set as the ABS, the radio base station eNB#1 is configured not to transmit PDSCH data in all OFDM symbols and configured to transmit a control signal, such as CRS (Cell Reference Signal, a reference signal for a first cell), in a predetermined OFDM symbol.

Furthermore, in a subframe set as the MBSFN subframe used for the "eICIC", the radio base station eNB#1 is configured to transmit the CRS only in the first OFDM symbol.

That is, in the subframe set as the MBSFN subframe used for the "eICIC", the radio base station eNB#1 is configured not to transmit PDSCH data in all OFDM symbols and configured not to transmit a control signal, such as CRS, in OFDM symbols other than the first OFDM symbol.

Meanwhile, in subframe set as a normal MBSFN subframe not used for the "eICIC", the radio base station eNB#1 is configured to be able to transmit data for MBMS.

The setting unit 11 may set a subframe, which is to be set as the ABS, and a subframe, which is to be set as the MBSFN subframe, in a manner to temporally overlap each other.

In addition, the setting unit 11 may be configured to exclude a subframe, in which the data for MBMS is transmitted among subframes set as the MBSFN subframe, from subframes to be set as the ABS.

The transmission unit 12 is configured to notify the radio base station eNB#10 of information (a pattern of the ABS or a pattern of the MBSFN subframe) on the subframe to be set as the ABS or the MBSFN subframe.

For example, the transmission unit 12 is configured to notify the information (the pattern of the MBSFN subframe) on the subframe, which is to be set as the MBSFN subframe, through "(X2) eNB Configuration Update" or "X2 Setup Request" that is transmitted to the radio base station eNB#10.

In addition, the transmission unit 12 may be configured to notify the information (the pattern of the MBSFN subframe) on the subframe, which is to be set as the MBSFN subframe, through the "X2 Setup Request" that is transmitted to the radio base station eNB#10.

Furthermore, the transmission unit 12 is configured to notify the information (the pattern of the ABS) on the subframe, which is to be set as the ABS, through "Load Information" that is transmitted to the radio base station eNB#10.

Moreover, the transmission unit 12 is configured to notify information (change information of the pattern of the MBSFN subframe) for instructing a change in the subframe, which is set as the MBSFN subframe, through the "(X2) eNB Configuration Update" or the "X2 Setup Request" that is transmitted to the radio base station eNB#10.

Alternatively, the transmission unit 12 may be configured to notify the information (the change information of the pattern of the MBSFN subframe) for instructing a change in the subframe, which is set as the MBSFN subframe, through "X2 Setup Response" that is transmitted to the radio base station eNB#10.

As illustrated in FIG. 3, the radio base station eNB#10 includes a reception unit 21 and a setting unit 22.

The reception unit 21 is configured to receive the information (the pattern of the ABS or the pattern of the MBSFN subframe) on the subframe, which is to be set as the ABS or the MBSFN subframe, from the radio base station eNB#1.

For example, the reception unit 21 is configured to receive the information (the pattern of the MBSFN subframe) on the subframe, which is to be set as the MBSFN subframe, through the "(X2) eNB Configuration Update" or the "X2 Setup Request" transmitted by the radio base station eNB#1.

In addition, the reception unit 21 may be configured to receive the information (the pattern of the MBSFN subframe) on the subframe, which is to be set as the MBSFN subframe, through "X2 Setup Response" transmitted by the radio base station eNB#1.

Furthermore, the reception unit 21 is configured to receive the information (the pattern of the ABS) on the subframe, which is to be set as the ABS, through the "Load Information" transmitted by the radio base station eNB#1.

Moreover, the reception unit 21 is configured to receive the information (the change information of the pattern of the MBSFN subframe) for instructing a change in the subframe, which is set as the MBSFN subframe, through the "(X2) eNB Configuration Update" transmitted by the radio base station eNB#1.

The setting unit 22 is configured to detect the subframe used for the "eICIC".

Figure 4:
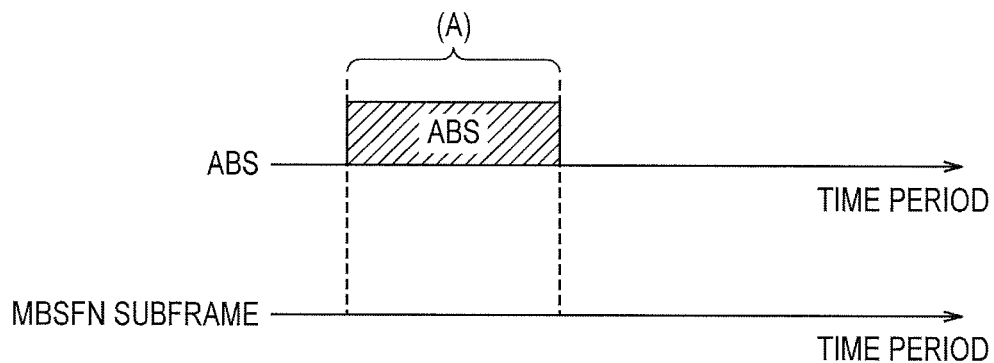
FIG. 4 is a diagram for explaining an operation of the radio base station eNB#10 according to the first embodiment of the present invention.
Figure 5:
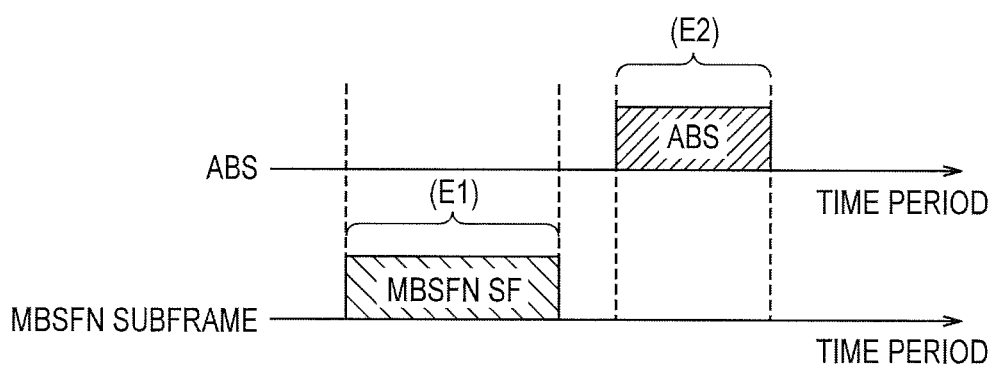
FIG. 5 is a diagram for explaining the operation of the radio base station eNB#10 according to the first embodiment of the present invention.

Specifically, as illustrated in FIG. 4 and FIG. 5, when one or a plurality of subframes, which have been notified through the "Load Information" by the radio base station eNB#1 and are to be set as the ABS, have not been set as the MBSFN subframe, the setting unit 22 may be configured to regard that the subframes have been used for the "eICIC".

For example, as illustrated in FIG. 4, when it is determined that no subframe set as the MBSFN subframe does not exist at the time point at which the "Load Information" transmitted by the radio base station eNB#1 is received by the reception unit 21, for example, when it is determined that the pattern of the MBSFN subframe has not been notified by the radio base station eNB#1, the setting unit 22 may be configured to regard that one or a plurality of subframes (A), which have been notified through the "Load Information" and are to be set as the ABS, have been used for the "eICIC".

In such a case, the setting unit 22 is configured to regard that the subframes (A) have been set as the ABS used for the "eICIC".

Furthermore, as illustrated in FIG. 5, even when it is determined that a subframe (E1) set as the MBSFN subframe exists at the time point at which the "Load Information" transmitted by the radio base station eNB#1 is received by the reception unit 21, if one or a plurality of subframes (E2), which have been notified through the "Load Information" and are to be set as the ABS, and the subframe (E1) do not temporally overlap each other, the setting unit 22 may be configured to regard that the subframes (E2) have been used for the "eICIC", and to regard that data for MBMS is transmitted in the subframe (E1).

In such a case, the setting unit 22 is configured to regard that the subframes (E2) have been set as the ABS used for the "eICIC", and to regard that the subframe (E1) is set as the normal MBSFN subframe not used for the "eICIC".

Figure 6:
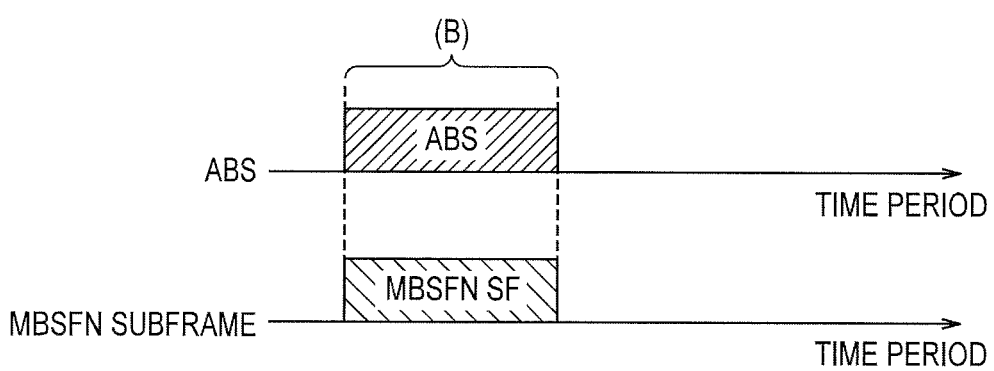
FIG. 6 is a diagram for explaining the operation of the radio base station eNB#10 according to the first embodiment of the present invention.
Figure 7:
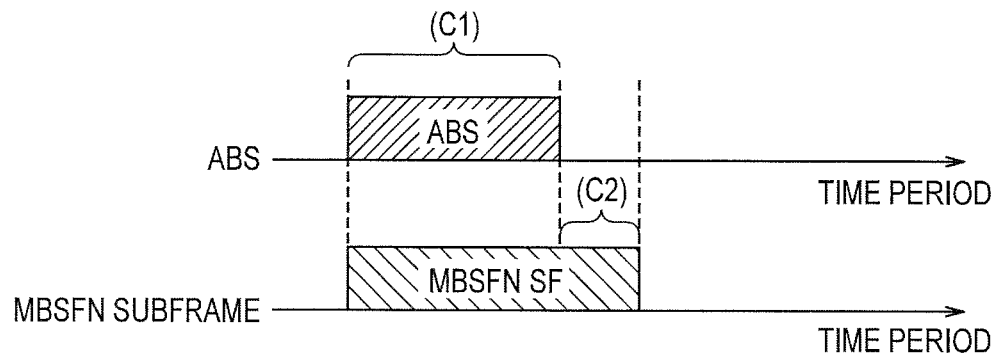
FIG. 7 is a diagram for explaining the operation of the radio base station eNB#10 according to the first embodiment of the present invention.
Figure 8:
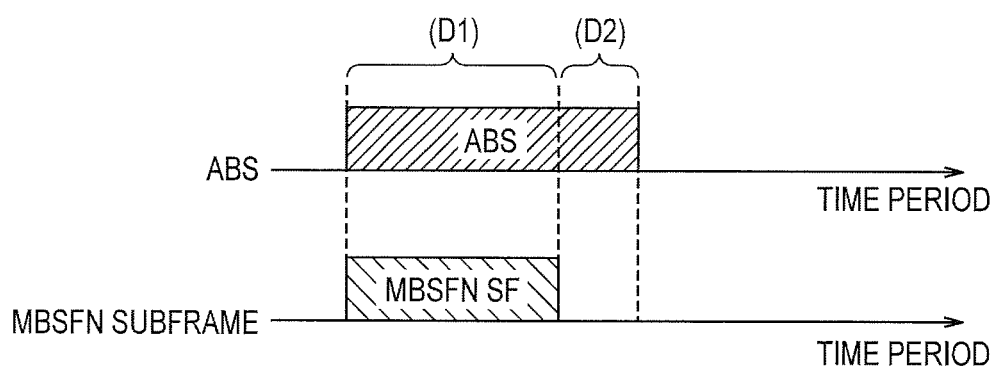
FIG. 8 is a diagram for explaining the operation of the radio base station eNB#10 according to the first embodiment of the present invention.

Furthermore, as illustrated in FIG. 6 to FIG. 8, when the subframe set as the MBSFN subframe exists in the subframes that have been notified by the radio base station eNB#1 through the "Load Information" and are to be set as the ABS, the setting unit 22 may be configured to regard that the subframe set as the MBSFN subframe is used for the "eICIC".

For example, as illustrated in FIG. 6, when a subframe (B) that is notified by the radio base station eNB#1 through the "Load Information" and is to be set as the ABS matches a subframe (B) set as the MBSFN subframe, the setting unit 22 may be configured to regard that the subframe (B) is used for the "eICIC".

In such a case, the setting unit 22 is configured to regard that the subframe (B) is set as the MBSFN subframe used for the "eICIC".

Furthermore, as illustrated in FIG. 7, when a subframe (C1) that is notified by the radio base station eNB#1 through the "Load Information" and is to be set as the ABS is included in subframes (C1) and (C2) set as the MBSFN subframe, the setting unit 22 may be configured to regard that the subframe (C1) is used for the "eICIC", and to regard that data for MBMS is transmitted in the subframe (C2).

In such a case, the setting unit 22 is configured to regard that the subframe (C1) is set as the MBSFN subframe used for the "eICIC", and to regard that the subframe (C2) is set as the normal MBSFN subframe not used for the "eICIC".

Furthermore, as illustrated in FIG. 8, when a subframe (D1) set as the MBSFN subframe is included in subframes (D1) and (D2) that have been notified by the radio base station eNB#1 through the "Load Information" and are to be set as the ABS, the setting unit 22 may be configured to regard that the subframes (D1) and (D2) have been used for the "eICIC".

In such a case, the setting unit 22 is configured to regard that the subframe (D1) is set as the MBSFN subframe used for the "eICIC", and to regard that the subframe (D2) is set as the ABS used for the "eICIC".

Furthermore, when the reception unit 21 receives the "(X2) eNB Configuration Update" including the change information of the pattern of the MBSFN subframe, the setting unit 22 is configured to change the setting of the MBSFN subframe and release the setting of ABS on the basis of the change information of the pattern of the MBSFN subframe.

Then, when the reception unit 21 receives the "Load Information" including "the pattern of the ABS", the setting unit 22 is configured to newly set a subframe, which is designated by "the pattern of the ABS", as the ABS.

Hereinafter, with reference to FIG. 9, an operation of the mobile communication system according to the present embodiment will be described.

Figure 9:
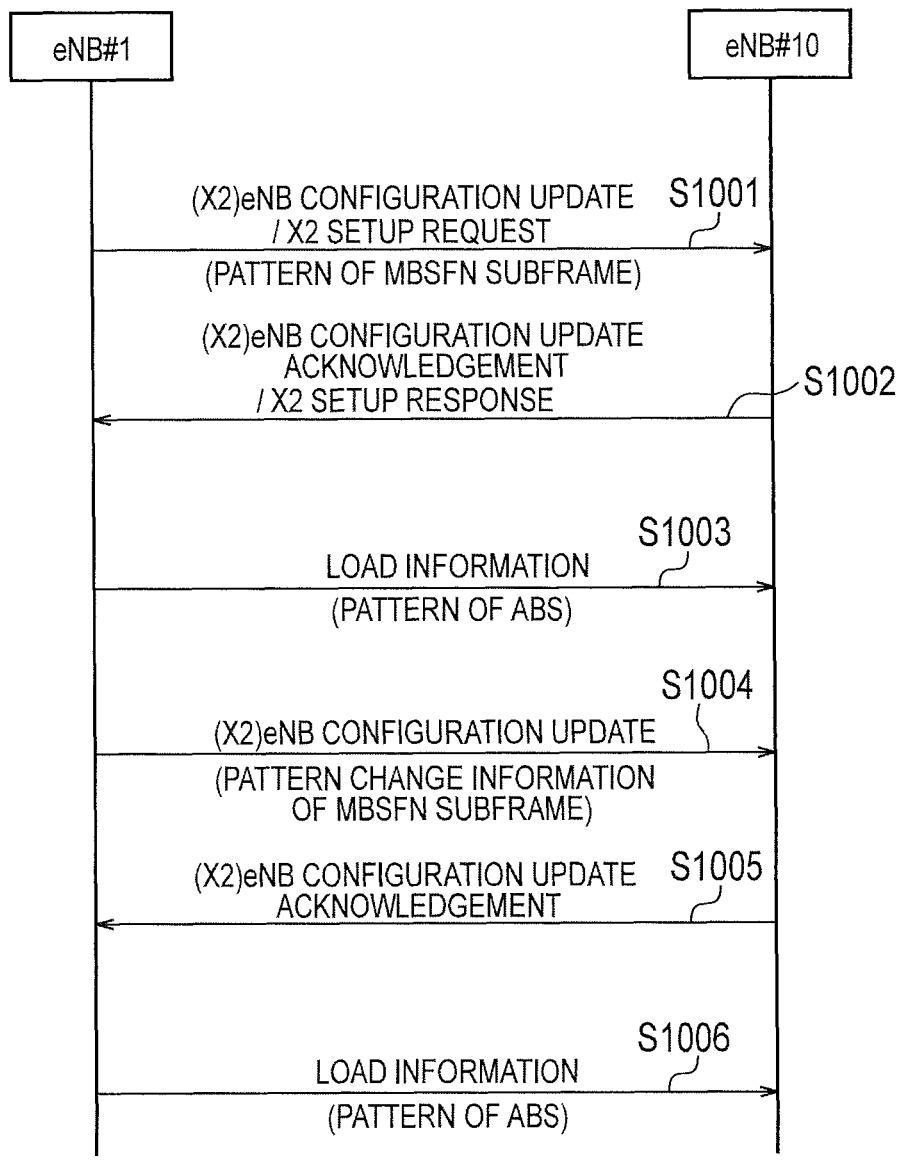
FIG. 9 is a diagram for explaining an operation of the mobile communication system according to the first embodiment of the present invention.

As illustrated in FIG. 9, in step S1001, the radio base station eNB#1 transmits "(X2) eNB Configuration Update" or "X2 Setup Request", which includes information (a pattern of an MBSFN subframe) on a subframe to be set as the MBSFN subframe, to the radio base station eNB#10.

In step S1002, the radio base station eNB#10 transmits "(X2) eNB Configuration Update Acknowledgement" or "X2 Setup Response" to the radio base station eNB#1.

Furthermore, the radio base station eNB#10 sets a subframe, which is designated by the pattern of the MBSFN subframe, as the MBSFN subframe. In addition, at this time point, the radio base station eNB#10 is not able to distinguish an MBSFN subframe used for "eICIC" from an MBSFN subframe not used for the "eICIC".

In step S1003, the radio base station eNB#1 transmits "Load Information", which includes information (a pattern of ABS) on a subframe to be set as the ABS, to the radio base station eNB#10.

Furthermore, the radio base station eNB#10 sets a subframe, which is designated by the pattern of the ABS, as the ABS, and detects the subframe used for the "eICIC", as illustrated in FIG. 4 to FIG. 8.

In step S1004, the radio base station eNB#1 transmits "(X2) eNB Configuration Update", which includes information (change information of the pattern of the MBSFN subframe) for instructing a change in the subframe set as the MBSFN subframe, to the radio base station eNB#10.

In step S1005, the radio base station eNB#10 changes the setting of the MBSFN subframe and releases the setting of the ABS on the basis of the change information of the pattern of the MBSFN subframe, and transmits the "(X2) eNB Configuration Update Acknowledgement" to the radio base station eNB#1.

In step S1006, the radio base station eNB#1 transmits the "Load Information", which includes the information (the pattern of the ABS) on the subframe to be set as the ABS, to the radio base station eNB#10.

Furthermore, the radio base station eNB#10 newly sets a subframe, which is designated by the pattern of the ABS, as the ABS, and detects the subframe used for the "eICIC", as illustrated in FIG. 4 to FIG. 8 described above.

In accordance with the mobile communication system according to the present embodiment, by the sequence illustrated in FIG. 9, it is possible to appropriately change the setting of the MBSFN subframe not used for the "eICIC", and the setting of the ABS and the MBSFN subframe used for the "eICIC".

(First Modification)

Hereinafter, with reference to FIG. 10 through FIG. 13, a mobile communication system according to the first modification of the present invention will be described while focusing on the difference from the mobile communication system according to the first embodiment described above.

In the mobile communication system according to the first modification, when the setting unit 11 of the radio base station eNB#1 determines to change subframes to be set as an MBSFN subframe and ABS, the transmission unit 12 of the radio base station eNB#1 is configured to notify the radio base station eNB#10 of change information of a pattern of the MBSFN subframe and change information of a pattern of the ABS through one "(X2) eNB Configuration Update".

For example, the transmission unit 12 is configured to be able to set the change information of the pattern of the MBSFN subframe in an information element "MBSFN Subframe Info" of an information element "Served Cell Information (refer to FIG. 11)" of the "(X2) eNB Configuration Update (refer to FIG. 10)".

Furthermore, the transmission unit 12 is configured to be able to set the change information of the pattern of the ABS in an information element "Almost Blank Subframe Information (refer to FIG. 12)" of the information element "Served Cell Information (refer to FIG. 11)" of the "(X2) eNB Configuration Update (refer to FIG. 10)".

Furthermore, when the reception unit 21 of the radio base station eNB#10 receives the "(X2) eNB Configuration Update" including the "change information of the pattern of the MBSFN subframe" and the "change information of the pattern of the ABS" from the radio base station eNB#1, the setting unit 22 of the radio base station eNB#10 is configured to change the setting of the MBSFN subframe and the ABS on the basis of the "change information of the pattern of the MBSFN subframe" and the "change information of the pattern of the ABS".

Hereinafter, with reference to FIG. 13, an operation of the mobile communication system according to the first modification will be described.

Figure 13:
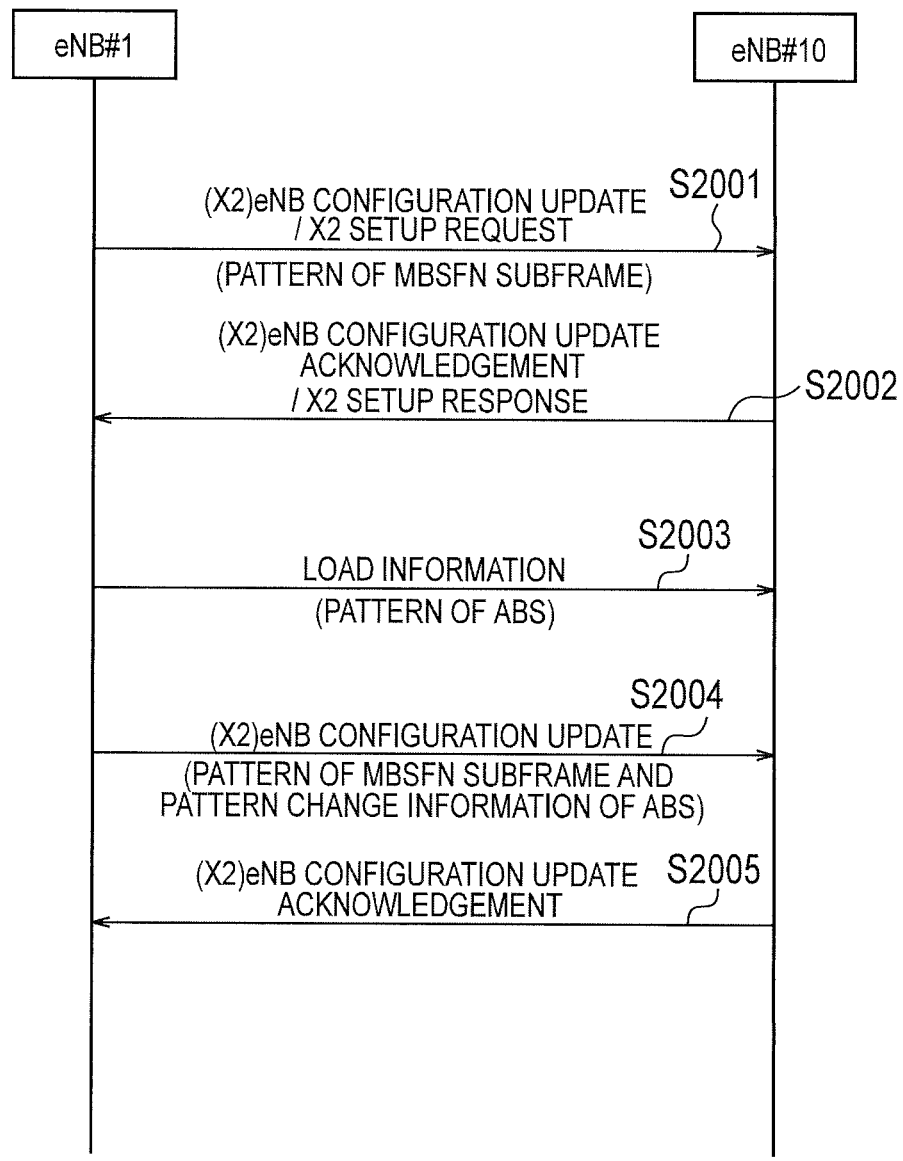
FIG. 13 is a diagram for explaining an operation of the mobile communication system according to the first modification of the present invention.

As illustrated in FIG. 13, in step S2001, the radio base station eNB#1 transmits "(X2) eNB Configuration Update" or "X2 Setup Request", which includes information (a pattern of an MBSFN subframe) on a subframe to be set as the MBSFN subframe, to the radio base station eNB#10.

In step S2002, the radio base station eNB#10 transmits "(X2) eNB Configuration Update Acknowledgement" or "X2 Setup Response" to the radio base station eNB#1.

Furthermore, the radio base station eNB#10 sets a subframe, which is designated by the pattern of the MBSFN subframe, as the MBSFN subframe. In addition, at this time point, the radio base station eNB#10 is not able to distinguish an MBSFN subframe used for "eICIC" from an MBSFN subframe not used for the "eICIC".

In step S2003, the radio base station eNB#1 transmits "Load Information", which includes information (a pattern of ABS) on a subframe to be set as the ABS, to the radio base station eNB#10.

Furthermore, the radio base station eNB#10 sets a subframe, which is designated by the pattern of the ABS, as the ABS, and detects the subframe used for the "eICIC", as illustrated in FIG. 4 to FIG. 8.

In step S2004, the radio base station eNB#1 transmits "(X2) eNB Configuration Update", which includes information (change information of the pattern of the MBSFN subframe) for instructing a change in the subframe set as the MBSFN subframe and information (change information of the pattern of the ABS) for instructing a change in the subframe set as the ABS, to the radio base station eNB#10.

In step S2005, the radio base station eNB#10 changes the setting of the MBSFN subframe and the ABS on the basis of the "change information of the pattern of the MBSFN subframe" and the "change information of the pattern of the ABS", and transmits "(X2) eNB Configuration Update Acknowledgement" to the radio base station eNB#1.

In accordance with the mobile communication system according to the first modification, by the sequence illustrated in FIG. 13, it is possible to appropriately change the setting of the MBSFN subframe not used for the "eICIC", and the setting of the ABS and the MBSFN subframe used for the "eICIC".

Furthermore, in accordance with the mobile communication system according to the first modification, it is possible to notify both the "change information of the pattern of the MBSFN subframe" and the "change information of the pattern of the ABS" through one "(X2) eNB Configuration Update", so that it is possible to reduce the number of messages that are transmitted/received in order to change the setting of the MBSFN subframe not used for the "eICIC", and the setting of the ABS and the MBSFN subframe used for the "eICIC".

The characteristics of the present embodiment as described above may be expressed as follows.

A first characteristic of the present embodiment is summarized in that a mobile communication method, in which "eICIC (Enhanced Inter Cell Interference Coordination)" is performed between a cell #1 (a first cell) and a cell #10 (a second cell) by using a subframe set as an MBSFN subframe (a first subframe) and a subframe set as ABS (a second subframe) in a mobile communication system in which the cell #10 subordinate to a radio base station eNB#10 (a second radio base station) is geographically arranged to be superposed on the cell #1 subordinate to a radio base station eNB#1 (a first radio base station), includes: a step of setting, by the radio base station eNB#10, a subframe, which is designated by a "pattern of an MBSFN subframe (first setting information)" received from the radio base station eNB#1, as the MBSFN subframe; a step of setting, by the radio base station eNB#10, a subframe, which is designated by a "pattern of ABS (second setting information)" received from the radio base station eNB#1, as the ABS; a step of changing, by the radio base station eNB#10, setting of the MBSFN subframe and releasing setting of the ABS on the basis of "change information of the pattern of the MBSFN subframe (change information of the first subframe)" received from the radio base station eNB#1; and a step of newly setting, by the radio base station eNB#10, the subframe, which is designated by the "pattern of the ABS" received from the radio base station eNB#1, as the ABS, wherein the radio base station eNB#1 is able to transmit CRS (a reference signal for the first cell) only in a first OFDM symbol in the subframe set as the MBSFN subframe, and the radio base station eNB#1 is to transmit the CRS in a predetermined OFDM symbol in the subframe set as the ABS.

A second characteristic of the present embodiment is summarized in that a mobile communication method, in which "eICIC" is performed between a cell #1 and a cell #10 by using a subframe set as an MBSFN subframe and a subframe set as ABS in a mobile communication system in which the cell #10 subordinate to a radio base station eNB#10 is geographically arranged to be superposed on the cell #1 subordinate to a radio base station eNB#1, includes: a step of setting, by the radio base station eNB#10, a subframe, which is designated by a "pattern of an MBSFN subframe" received from the radio base station eNB#1, as the MBSFN subframe; a step of setting, by the radio base station eNB#10, a subframe, which is designated by a "pattern of ABS" received from the radio base station eNB#1, as the ABS; and a step of changing, by the radio base station eNB#10, setting of the MBSFN subframe and the ABS on the basis of "change information of the pattern of the MBSFN subframe" and "change information of the pattern of the ABS (change information of the second subframe)" included in one "(X2) eNB Configuration Update (message)" received from the radio base station eNB#1, wherein the radio base station eNB#10 is able to transmit CRS only in a first OFDM symbol in the subframe set as the MBSFN subframe, and the radio base station eNB#10 is to transmit the CRS in a predetermined OFDM symbol in the subframe set as the ABS.

A third characteristic of the present embodiment is summarized in that a radio base station eNB, which is able to function as a radio base station eNB#10 in a mobile communication system which includes a cell #10, subordinate to the radio base station eNB#10, geographically arranged to be superposed on a cell #1 subordinate to a radio base station eNB#1 and is configured to be able to perform "eICIC" between the cell #1 and the cell #10 by using a subframe set as an MBSFN subframe and a subframe set as ABS, wherein the radio base station eNB#10 includes a setting unit 22 configured to set a subframe, which is designated by a "pattern of an MBSFN subframe" received from the radio base station eNB#1, as the MBSFN subframe, and to set a subframe, which is designated by a "pattern of ABS" received from the radio base station eNB#1, as the ABS, and wherein the setting unit 22 is configured to change setting of the MBSFN subframe and release setting of the ABS on the basis of "change information of the pattern of the MBSFN subframe" received from the radio base station eNB#1.

A fourth characteristic of the present embodiment is summarized in that a radio base station eNB, which is able to function as a radio base station eNB#1 in a mobile communication system which includes a cell #10, subordinate to a radio base station eNB#10, geographically arranged to be superposed on a cell #1 subordinate to the radio base station eNB#1, the mobile communication system being configured to be able to perform "eICIC" between the cell #1 and the cell #10 by using a subframe set as an MBSFN subframe and a subframe set as ABS, includes: a setting unit 11 configured to determine subframes to be set as the MBSFN subframe and the ABS; and a transmission unit 12 configured to notify the radio base station eNB#10 of the subframe to be set as the MBSFN subframe by a "pattern of the MBSFN subframe", and to notify the radio base station eNB#10 of the subframe to be set as the ABS by a "pattern of the ABS", wherein, when the setting unit 11 determines to change the subframes to be set as the MBSFN subframe and the ABS, the transmission unit 12 is configured to notify the radio base station eNB#10 of change information of the pattern of the MBSFN subframe and change information of the pattern of the ABS by one "(X2) eNB Configuration Update".

In addition, the operations of the radio base stations eNB#1 and eNB#10 may be performed by hardware, a software module executed by a processor, or a combination of the hardware and the software module.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base stations eNB#1 and eNB#10. Furthermore, the storage medium and the processor may be arranged in the radio base stations eNB#1 and eNB#10 as a discrete component.

Thus, the present invention has been explained in detail by using the above-mentioned embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST eNB#1, eNB#10 . . . Radio base station
11, 22 . . . Setting unit
12 . . . Transmission unit
21 . . . Reception unit

The invention claimed is:

1. A mobile communication method comprising: the steps of:
  a first radio base station notifying a second radio base station of a subframe designated by a pattern of Almost Blank Subframe (ABS) through Load Information;
  the second radio base station matching a subframe set as a Multicast Broadcast Single Frequency Network (MBSFN) subframe with the pattern; and
  the second radio base station setting the matching subframe as an MBSFN subframe used for enhanced Inter-cell Interference Coordination (eICIC).

2. A radio base station with a processor, which functions as a second radio base station in a mobile communication system including a first radio base station and the second radio base station, the processor comprising:
  a notifying unit that receives a notification from the first radio base station of a pattern of Almost Blank Subframe (ABS) through Load Information,
  the processor matches a subframe set as a Multicast Broadcast Single Frequency Network (MBSFN) subframe with the pattern, wherein the matching subframe as an MBSFN subframe is used for enhanced Inter-cell Interference Coordination (eICIC).

* * * * *